(12) United States Patent
Charoenruengkit et al.

(10) Patent No.: US 7,822,498 B2
(45) Date of Patent: Oct. 26, 2010

(54) USING A LOUDNESS-LEVEL-REFERENCE SEGMENT OF AUDIO TO NORMALIZE RELATIVE AUDIO LEVELS AMONG DIFFERENT AUDIO FILES WHEN COMBINING CONTENT OF THE AUDIO FILES

(75) Inventors: Werayuth T. Charoenruengkit, Delray Beach, FL (US); Francis Fado, Highland Beach, FL (US); Kha Dinh Nguyen, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 11/463,683

(22) Filed: Aug. 10, 2006

(65) Prior Publication Data

US 2008/0039964 A1    Feb. 14, 2008

(51) Int. Cl.
  *G06F 17/00* (2006.01)
  *H03G 3/00* (2006.01)
  *H04B 1/20* (2006.01)
(52) U.S. Cl. .............................. 700/94; 381/107; 369/4
(58) Field of Classification Search .................. 700/94; 381/104, 106, 107, 119; 704/224, 225, 234, 704/270; 369/4
See application file for complete search history.

(56) References Cited

U.S. PATENT DOCUMENTS

| | | | | |
|---|---|---|---|---|
| 5,761,639 A | * | 6/1998 | Takebayashi et al. | 704/253 |
| 6,411,927 B1 | * | 6/2002 | Morin et al. | 704/224 |
| 6,449,594 B1 | * | 9/2002 | Hwang et al. | 704/233 |
| 6,965,676 B1 | * | 11/2005 | Allred | 381/104 |
| 7,526,348 B1 | * | 4/2009 | Marshall et al. | 700/94 |
| 2001/0040969 A1 | * | 11/2001 | Revit et al. | 381/60 |
| 2007/0073539 A1 | * | 3/2007 | Chengalvarayan et al. | 704/245 |
| 2007/0174430 A1 | * | 7/2007 | Tedman et al. | 709/219 |

* cited by examiner

*Primary Examiner*—Vivian Chin
*Assistant Examiner*—Daniel R Sellers
(74) *Attorney, Agent, or Firm*—Patents on Demand, PA; Brian K. Buchheit

(57) ABSTRACT

The present invention records a loudness-level-reference segment of audio when creating speech audio files and audio files including background sounds. The speech audio files can then be combined with the background sound containing audio files in any desirable combination. When combining the files, the relative audio level of the files is matched, by matching the loudness-level-reference segments with each other. Any of a variety of known digital signal processing techniques can be used to normalize the component audio files. The combined audio files containing speech and background sounds (e.g. ambient noise) having matching relative audio levels can be used to test and/or train a speech recognition engine or a speech processing system.

19 Claims, 4 Drawing Sheets

USING A LOUDNESS-LEVEL-REFERENCE SEGMENT OF AUDIO TO NORMALIZE RELATIVE AUDIO LEVELS AMONG DIFFERENT AUDIO FILES WHEN COMBINING CONTENT OF THE AUDIO FILES

BACKGROUND

1. Field of the Invention

The present invention relates to the field of digital signal processing of audio, and, more particularly, to using a loudness-level-reference segment of audio to normalize relative audio levels among different audio files when combining content of the audio files.

2. Description of the Related Art

Speech recognition engines are tested and trained using speech recordings. These speech recordings include both speech and background noise. In order to comprehensively test or train a speech recognition engine, many different voices and background noises are required. The different combinations are meant to simulate real-world conditions in which the speech recognition engine will operate.

For example, a speech recognition engine used by an interactive voice response (IVR) system can expect to be used by talkers of different background environments are expected, each having different ambient noises and ambient noise levels. Background environments can include an interior of a car, a crowd, a public transportation environment, a business environment, a household environment, and the like.

One technique for obtaining audio files needed by the speech recognition engine is to record audio of a number of different talkers in each of a number of different audio environments. This technique, referred to as a real environment audio recording technique, is very expensive in terms of required man hours for talkers and recording operators to obtain the audio files. Additionally, the resulting audio files can require significant storage space.

Another technique for obtaining the audio files is to record talkers once in a sound room or an environment with minimal ambient noise and to record background sounds once for a number of different environments. The talker audio files are then combined with the background sounds to generate audio files with talker content and with ambient noise for different environments. This technique, referred to as a post-recording mixing technique, is much less expensive. Fewer total recordings are necessary to obtain the desired combinations of talkers and environments. Additionally, the audio files can be combined when needed, which conserves storage space of a speech processing system.

The post-recording mixing technique imposes a number of challenges. One challenge is to ensure that the relative audio level of the background sounds is appropriate for the relative audio level of the speech. When the audio levels are different, the combined audio file does not properly simulate a live situation. Accordingly, the tests and/or training activities that are based upon the combined audio are inaccurate.

On conventional means for adjusting audio levels is to have a human agent manually adjust the audio levels of the two component files. Results from a manual adjustment technique are highly dependent upon a skill of the human agent, are generally not subject to verification, and require significant time.

Another conventional means is to calibrate all recording devices to an equivalent audio recording level. When a recorded sound has a particularly high audio level relative to calibrated settings, clipping can occur. Similarly, when a recorded sound has a particularly low audio level relative to the calibrated settings, the resulting recording can be of relatively low quality. What is needed is a solution for implementing the post-recording mixing technique, which is not subject to drawbacks inherent in conventional implementation of the post-recording mixing technique.

SUMMARY OF THE INVENTION

The present invention records a loudness-level-reference audio segment of audio when creating speech audio files and audio files including background sounds. The speech audio files can then be combined with the background sound containing audio files in any desirable background and speech combination. When combining the files, the relative audio level of the files is matched, by matching the loudness-level-reference segments with each other. Any of a variety of known digital signal processing techniques can be used to normalize the component audio files. The combined audio files containing speech and background sounds (e.g., ambient noise) having matching relative audio levels can be used to test and/or train a speech recognition engine or a speech processing system.

The present invention can be implemented in accordance with numerous aspects consistent with the material presented herein. For example, one aspect of the present invention can include a method for combining audio. The method can detect audio content contained in two different audio files. Each of the audio files can include a loudness-level-reference segment and audio content. Each reference segment can be played at an approximately equivalent volume in an environment in which a recording device records the associated audio file. Audio level input settings for the recording device can remain unchanged with the reference segment and the audio content are recorded. An audio level of at least one of the audio files can be adjusted when necessary so that an audio level of the reference segments are approximately equivalent. The adjusted audio files can be combined into a combined audio file.

Another aspect of the present invention can include a method for recording audio so that the recorded audio is able to be combined with other audio at matching relative audio levels. A loudness-level-reference audio segment can be played in an audio environment and can be recorded by a recording device. Additional audio content can be recorded with the recording device without adjusting recording audio level settings from those settings established when the loudness-level-reference audio segment audio segment and the additional audio content. A sound pressure level of the played loudness-level-reference audio segment can be standardized for many different audio files. The loudness-level-reference can be used to ensure different audio files are able to be combined at approximately matching relative audio levels.

Still another aspect of the present invention can include a system for combining audio, which includes a data store and an audio combiner. The data store can include two or more audio files. Each audio file can include a loudness-level-reference audio segment and additional audio content. Each loudness-level-reference audio segment can be played in an audio environment as a standardized sound pressure level in relation to a recording device, which recorded the audio files. The audio combiner can combine the additional audio content of at least two audio files into a single audio file. The audio combiner can ensure that the additional audio content is combined at an approximately matching audio level by using the loudness-level-reference audio segments to match audio levels of audio content from component audio file to each other.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally enclosed signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 4 is a flow chart of a method where a service agent can configure a system that implements loudness-level-references to combine audio in accordance with an embodiment of the inventive arrangements disclosed wherein.

DETAILED DESCRIPTION OF THE INVENTION

Figure 1:
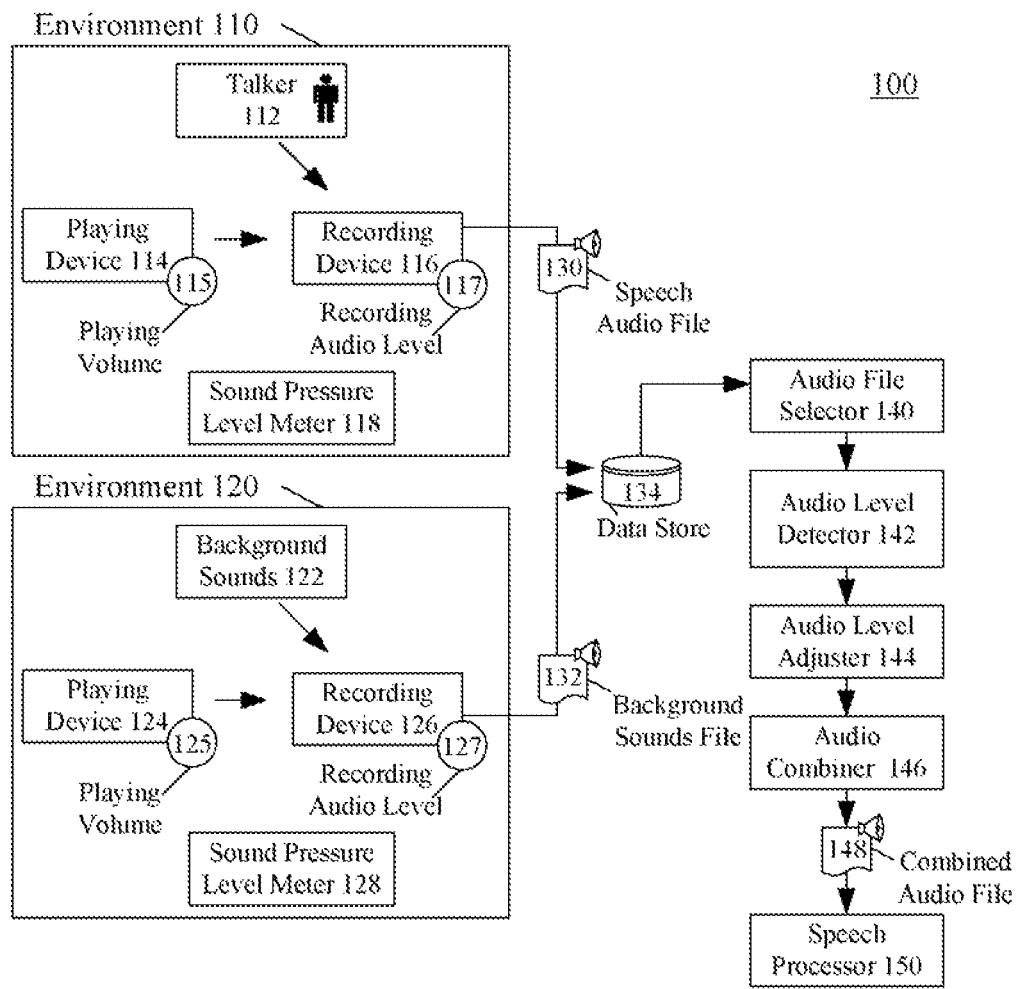
FIG. 1 is a schematic diagram of a system for combining audio files using a loudness-level-reference segment in accordance with an embodiment of the inventive arrangements disclosed herein.

FIG. 1 is a schematic diagram of a system 100 for combining audio files using a loudness-level-reference segment in accordance with an embodiment of the incentive arrangements disclosed herein. System 100 combines two different audio files 130 and 132 to generate a combined audio file 148, which can be conveyed to speech processor 150. The speech processor 150 can include a speech recognition engine that is tested and/or trained using the combined audio file 148.

Each of the audio files 130, 132, and 148 can include audio content stored upon a medium. The audio content can include analog of digital content. Analog content can be converted into digital content before or during processing to take advantage of digital signal processing technologies. The medium upon which the audio content can be stored can include a magnetic medium, an optical medium, a semiconductor memory, a digitally encoded plastic memory, a holographic memory, or any other recording medium.

For purposes of system 100, streamed audio content and real-time captured audio can be considered "audio files." For example, a talker's (112) speech can be captured in real time (audio file 130) and can be dynamically combined with a pre-recorded ambient noise audio file 132 to form a real-time audio stream (combined audio file 148) that is input into speech processor 150.

In one embodiment, the audio file 130 can include recorded speech content with minimal ambient noise. The audio file 132 can include recorded background sounds, which can be considered ambient noise for purposes of the combined audio file 148. The combined audio file 148 can be a file containing speech and ambient noise.

Although the combined audio file 148 is shown as combining two component audio file 130 and 132, the invention is not limited in this regard and multiple component audio files can be combined to generate the combined audio file 148. For example, a speech containing audio file 130 can be combined with background sounds file 132 for a car-at-idle environment and another background sounds file 132 for an example can simulate a speaker issuing speech commands form a idling car with a window down when the car is stopped at a red light of a city.

The audio recordings 130 and 132 can be generated in audio environments 110 and 120. Environment 110 can be an environment where speech of a talker 112 is recorded with minimal ambient noise. Environment 120 can be an environment where background sounds 122 are recorded. Although the background sounds 122 of environment 120 can include speech, this speech is merely part of a talker 112 is environment 120 can include speech, this speech is merely part of ambient noise for a combined audio file 148 and is not to be intentionally speech recognized by speech processor 150.

Each environment 110 and 120 can include a recording device 116 and/or 126 having an associated recording audio level 117 and/or 127. The recording audio levels 117 and 127 can be optimized for the audio environment 110 and 120. Accordingly, the recording audio levels 117 and 127 to be optimized for the audio being recorded ensures that audio file 130 and 132 are high quality and do not suffer from excessive clipping of have poor signal-to-noise-ratio (SNR) quality.

Each environment 110 and 120 can also include a playing device 114 and 124 having an associated playing volume 115 and 125. The playing devices 114 and 124 can play a loudness-level-reference that is recorded by device 116 and/or 126. The loudness-level-reference can be recorded in the audio file separate from other audio content. For example, the reference segments can be thirty seconds recordings placed in audio files 130 and/or 132 before other audio content. Importantly, recording audio level 117 and 127 is to remain unchanged during between the loudness-level-reference audio segments and the other audio content.

The purpose of the loudness-level-reference segments is to establish a baseline audio level for the two different audio recordings. That is, the loudness-level-reference segments represent a fixed audio level relative to each other. Because different recording devices 116 and/or 126 and playing devices 114 and 124 can be calibrated differently and because a recording loudness can vary based upon a distance between a playing device 114 and 124 and a recording device 116 and 126, sound pressure level meters 118 and 128 can be used to ensure the reference segments are played at a common relative volume.

For example, the sound pressure level meters 118 and 128 can calibrate output from playing devices 114 and 124 so that output is at a pre-selected level (e.g. 80 dB SPL C-weight) measured at a pre-selected distance (e.g. 1 inch) from the recording device 116 or 126. Values chosen for the pre-selected level and pre-selected distance are unimportant so long as they are consistent between environments 110 and 120. Playback volumes 115 and 125 can be adjusted as necessary to ensure consistent output volumes at the recording device 116 or 126 achieved, as determined by the sound pressure level meters 118 and 128. When necessary, the recording audio levels 117 and 127, which may have been previously optimized for talker 112 and/or background sounds 122, can be adjusted to ensure the loudness-level-reference audio segment is not clipped and/or does not have an unacceptably low quality. Audio files 130 and 132 can be stored in data store 134.

In one embodiment, system 100 can optionally record multiple different loudness-level-references for each audio file 130 and/or 132. The different loudness-level-references can be played by playing devices 114 and 124 using different settings. For example, one loudness-level-reference can be played at 80 dB, another at 70 dB, and another at 60 dB. Each loudness-level-reference can be played for a pre-selected time, such as 30 seconds, and can be recorded by recording device 116 or 126. The different loudness-level-references can be followed by audio content recorded at a same recording audio level 117 and/or 127 as that used for the different loudness-level-references.

The use of multiple different loudness-level-references can facilitate audio level matching between audio files 130 and 132 when recording audio levels 117 and 127 vary greatly between different combinable audio files. For instance, when one of the audio files 130-132 has an average SPL of 50 dB and another has an average SPL of 60 dB, it can be advantageous to normalize relative audio levels of the files 130-132 using a loudness-reference-level of 60 dB. In another illustrative instance, when one of the audio files 130-132 has an average recorded SPL of 90 dB and another has an average SPL of 80 dB it can be advantageous to normalize relative audio levels of the files 130-132 using a loudness-reference-level of 80 dB. When processing the audio files 130-132 to a normalized audio level, it is important to use a common loudness-reference-level for each file 130-132, such as using a 60 dB loudness-reference-level for both audio files 130-132, and to ignore other loudness-reference-levels, such as the 70 dB and 80 dB loudness-reference-levels. Hence, in cases where the recorded sound level is low, to maintain a quality SNR, loudness-reference-levels of 80 dB and 70 dB can be omitted due to clipping. In this case, loudness-reference-level of 60 dB can be used as a reference when compared with other audio files.

The audio file selector 140 can permit a user to select audio files from data store 134, which are to be combined to form combined audio file 148. For example, the audio file selector 140 can be a software component of a speech processing tool that permits a user to select one speech file and one ambient noise file from a graphical user interface (not shown). Selected audio files can be sent to the audio level detector 142, which determines a recording audio level for each selected audio file.

The audio level adjuster 144 can then process the audio files to ensure that the selected audio files are mixed together at a matching level of relative audio level. The audio level adjustor 144 can use the loudness-level-reference audio segments of each file 130 and 132 match audio level, since the reference segments by definition have been played at approximately equivalent audio levels when recorded.

The audio combiner 146 can combine the adjusted audio files together to generate the combined audio file 148. When the component audio files 130 and 132 are of different lengths, the audio combiner 146 can adjust the lengths to match. For example, generally relatively long segments of background sounds will be recorded for audio file 132, which can be truncated to match the length of the speech file 130. In another example, a background sound file 132 can be looped to match a length of a longer speech file 130. When looping techniques are used, the resulting audio can be processed to ensure that looped audio segments match at junction points to prevent discontinuities. The combined audio file 148 can then be input into the speech processor 150 for testing and/or training purposes.

It should be appreciated that although the invention is explained in terms of combining speech audio files with ambient noise audio files for speech processing purposes, the invention is not so limited. Rather, any audio files can be combined with any other audio files using the inventive solution to ensure that audio level is normalized in the combined audio file. This occurs regardless of audio levels of the component audio recordings. For example, the system 100 can be used by a sound editing software program that includes numerous background noises, which are to be combined to simulate background noise for a resultant multimedia product. To illustrate, a city-noise audio file can be combined with a crowd-noise audio file, a police-siren audio file, and a dialog audio file to produce a movie soundtrack for a scene where dialog is taking place in a city, near a crowd, with a police siren sounding nearby.

Although shown in system 100 as discrete components, functions described for components 142-150 can be implemented in any number of components. For example, in one contemplated embodiment, the components 142-150 can be integrated into an integrated speech processing system that permits any user selectable combination of speech files and ambient noise files to be mixed for speech recognition testing and/or training purposes.

It should be noted that any of a variety of known audio processing techniques can be used by the audio level detector 142, the audio level adjustor 144, and the audio combiner 146, and the invention is not to be construed as limited to any specific technique. In one embodiments, the audio level detector 142 can determine an average Root Mean Square (RMS) energy for the loudness-level-reference audio segments. The audio level adjustor 144 can then compare the RMS energy of the speech audio file 130 against the background sounds file 132. For example, an energy ratio can be determined by dividing the speech loudness-level-reference RMS value by the background sounds loudness-level-reference RMS value.

When the ratio is less than or equal to one, this means that the ambient noise loudness-level-reference (file 132) is higher than or equal to that of the speech file 130, which indicates that the microphone gain (recording audio level 127) was higher in environment 120 than the microphone gain (recording audio level 117) of environment 110. Therefore to normalize the level of loudness between the two files, the level of the ambient noise (file 132) can be lowered by the calculated ratio. As a result, the audio content of audio file 132 is adjusted by the calculated ratio. This is equivalent to adjusting the recording audio level 127 of environment 120 to the recording audio level 117 of environment 110. Similarly, if the calculated ratio is greater than one, the inverse of the ratio can be taken, and the audio content of file 130 can be adjusted by this inverse ratio, which is the equivalent to lowering the loudness level of the file 130 to match the loudness-level of file 132.

In system 100, data store 134, audio file selector 140, audio level detector 142, audio level adjuster 144, audio combiner 146, and/or speech processor 150 can be communicatively linked via one or more networks (not shown). The networks can include any hardware/software/and firmware necessary to convey digital content encoded within carrier waves. Content can be contained within analog or digital signals and conveyed through data or voice channels. The networks can include local components and data pathways necessary for communications to be exchanged among computing device components and between integrated device components and peripheral devices. The networks can also include network equipment, such as routers, data lines, hubs, and intermediary servers which together form a packet-based network, such as the Internet or and intranet. The networks can further include circuit-based communication components and mobile communication components, such a telephony switches, modems, cellular communication towers, and the like. The networks can include line based and/or wireless communication pathways.

Figure 2:
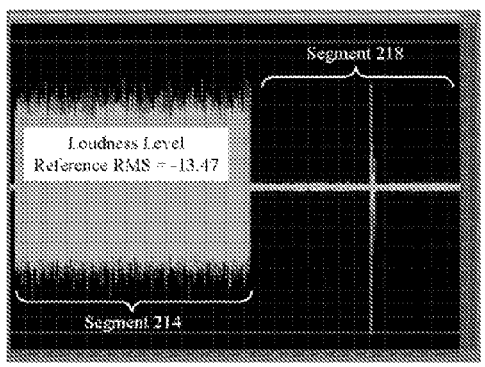
FIG. 2 shows a multiple audio files that are combined at a normalized audio level using loudness-level-references used in accordance with an embodiments of the inventive arrangements disclosed herein.
Figure 2:
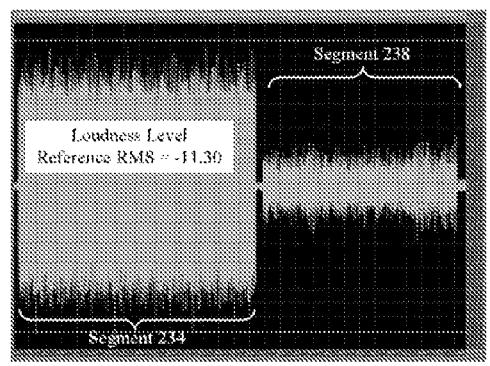
Figure 2:
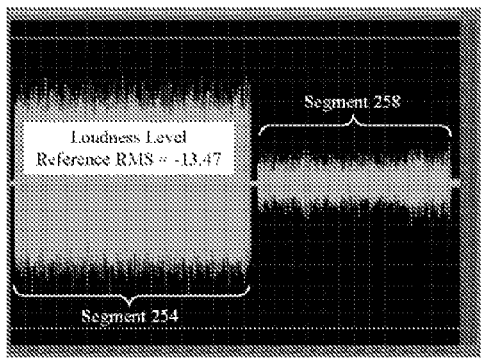
Figure 2:
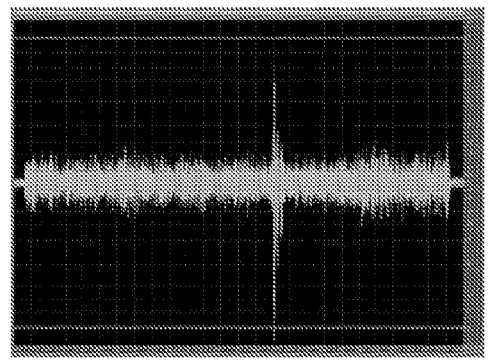

FIG. 2 shows multiple audio files 210, 230, 250, and 270 that are combined at a normalized audio level using loudness-level-references used in accordance with an embodiment of the inventive arrangements disclosed herein. Audio files 210, 230, 250, and 270 can represent specific instances of audio files 130, 132, and 148 from system 100.

Audio file 210 can include a loudness-level-reference audio segment 214 followed by a speech audio segment 218. Audio file 230 can include a loudness reference audio segment 234 followed by a background sound audio segment 238. Audio file 250 can be a digitally processed representation of audio file 230, which has been adjusted to ensure that the loudness-level-reference audio segment 254 matches the loudness-level-reference audio segment 214. Thus, the audio level (or relative energy) of audio file 230 has been decreased by a constant value using digital signal processing techniques to create audio file 250. Audio file 210 and audio file 250, which have matching relative audio levels, are then combined to create audio file 270.

Audio level differences between segments 214 and 234 are due to different microphone settings or recording audio level settings. Adjusting the relative audio levels of segments 214 and 234 match (and performing the same adjustment on the associated audio segments 218 and/or 238) ensures that corresponding relative loudness levels exist between the adjusted files to match a live situation.

More specifically, an audio level detector can a determine RMS energy for reference segment 214, which for illustrative purposes can equal −13.47 dB. An audio level detector can also determine that RMS energy for reference segment 234 equals −11.3 dB. Hence, reference segment 234 can be 2.17 dB greater than reference segment 214. Audio file 230 can be digitally processed to reduce an amplitude of segment 234 of the audio by 2.17 dB. The entire audio file 230 is processed when the amplitude is reduced so that as segment 234 is reduced to match segment 214, segment 238 is reduced in a corresponding fashion. Audio file 250 results from processing file 230. The non-reference portions (218 and 258) of the audio files 210 and 250 can then be combined to create audio file 270.

Figure 3:
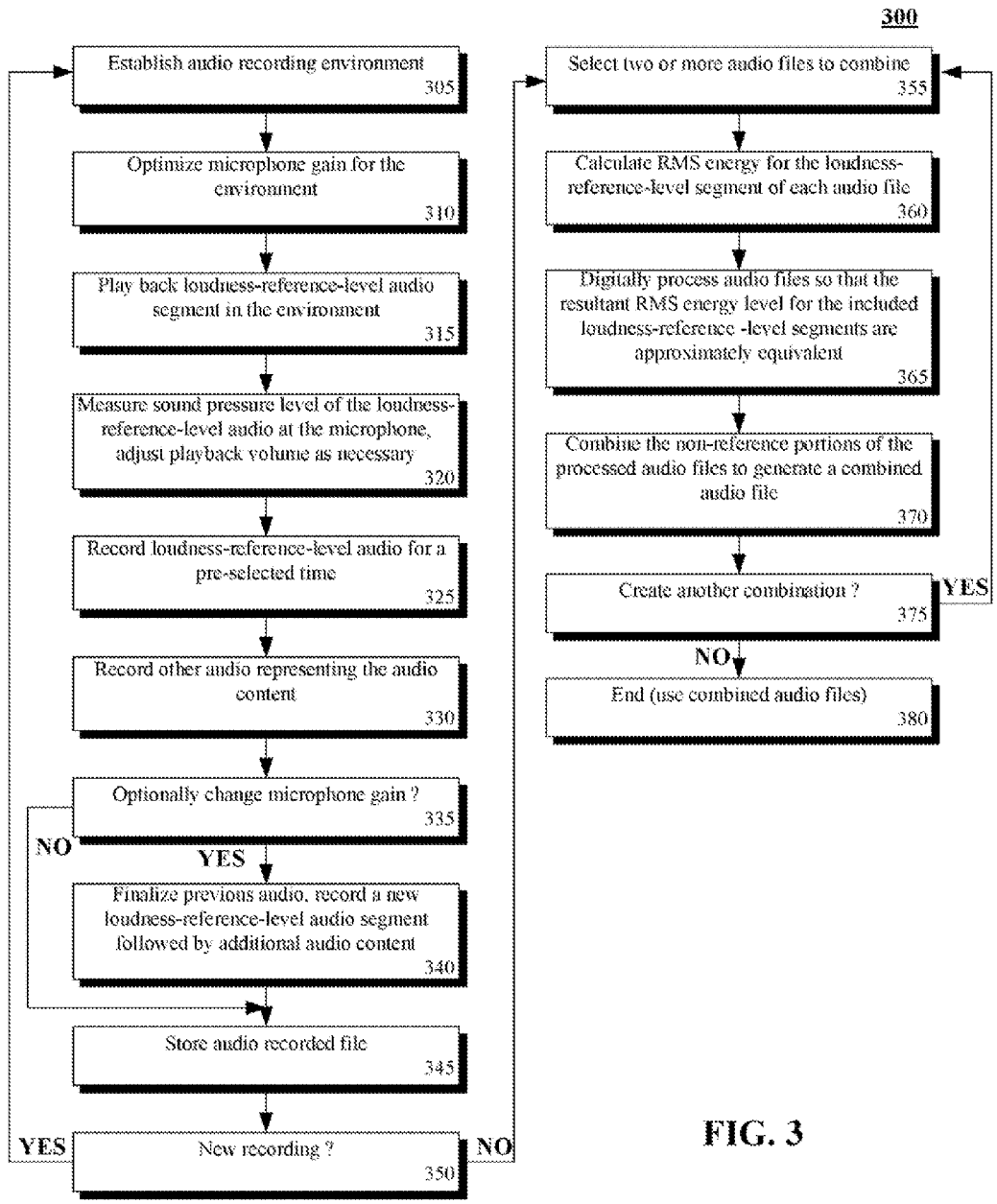
FIG. 3 is a flow chart of a method for combining audio at approximately equivalent relative audio levels using loudness-level-references in accordance with an embodiment of the inventive arrangements disclosed herein.

FIG. 3 is a flow chart of a method 300 for combining audio at approximately equivalent relative audio levels using loudness-level-references in accordance with an embodiment of the inventive arrangements disclosed herein. Method 300 can be implemented in the context of a system 100 or any other system that combines audio file content.

Method 300 can begin in step 305, where an audio recording environment can be established. In step 310, microphone gain can be optimized for the environment. For example a recording audio level, which includes setting a microphone gain, can be optimized for a talker when the audio environment is established to capture speech of the talker. Recording audio level can be optimized for recording back ground sounds, such as a thunderstorm or traffic sounds. In step 315, a loudness-level-reference audio segment can be played back in the environment. In step 320, a sound pressure level (SPL) or other audio level measurement can be determined for the loudness-level-reference to achieve a standardized audio loudness level at the microphone. The playback volume can be adjusted as necessary. Microphone gain can optionally be adjusted from the previously optimized state to ensure clipping of the loudness-level-reference does not occur.

In step 325, loudness-level-reference audio can be recorded for a pre-selected time, such as thirty seconds. The time can be adjusted as desired, but should be sufficient to compute an accurate RMS energy value based upon the recorded. During this step, the microphone gain is to remain at the same setting as when the loudness-level-reference audio segment was recorded. In step 340, where the previous audio can be finalized and a new loudness reference audio segment can be recorded followed by additional audio content. After all audio content has been recorded with an appropriate loudness-level-reference audio segment, the recorded audio can be stored in step 345.

In step 350, a determination can be made as to whether another audio recording is to be made. If so, the method can loop to step 305, where the new audio recording environment can be established. Otherwise, the method can progress from step 350 to step 355, where two or more previously recorded audio files can be selected.

In step 360, an RMS energy value can be calculated for the loudness-level-reference segments of each audio file. In step 370, the processed audio files can be combined to generate a combined audio file. During this step, the loudness-level-reference audio portions of each audio file can be optionally excluded. In step 375, a determination can be made as to whether additional audio files are to be combined. If so, the method can loop from step 375 to step 355, where different audio files can be selected. When no additional audio file combinations are necessary, the method can end in step 380. The previously combined audio segment can be used at this point. For example, the combined audio segment can include speech (from a first component file) and ambient noise (from a second component file), which can be fed into a speech processing system to test or train the system.

Figure 4:
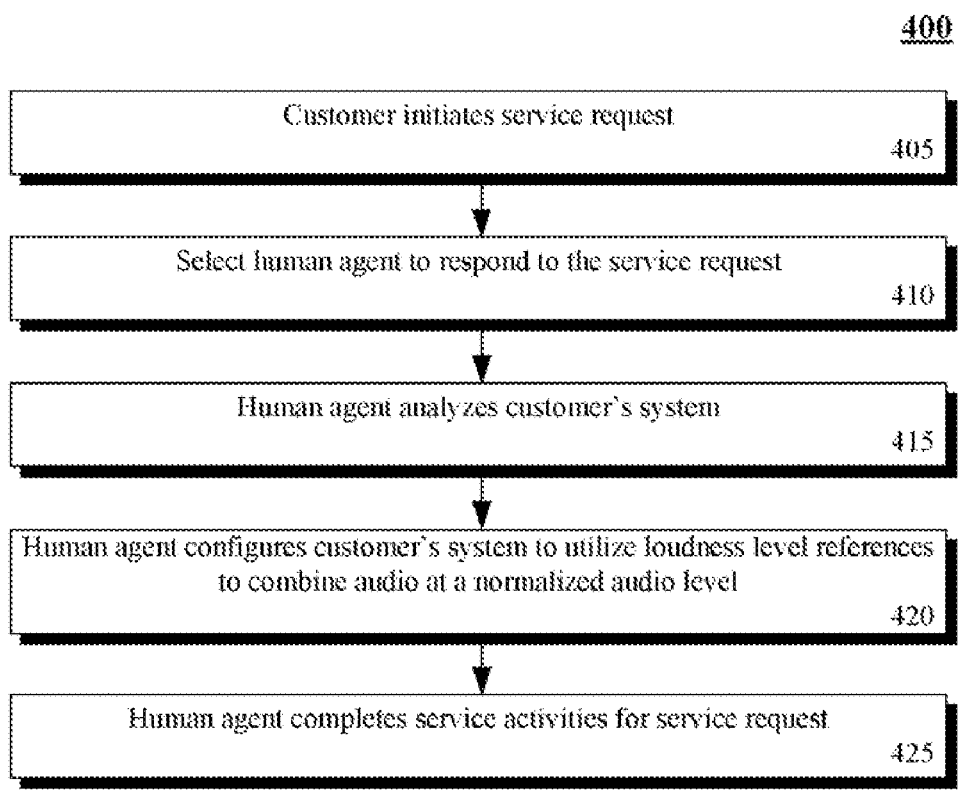

FIG. 4 is a flow chart of a method 400 where a service agent can configure a system that implements loudness-level-references to combine audio in accordance with an embodiment of the inventive arrangements disclosed herein. Method 400 can be preformed in the context of system 100 or a method 300.

Method 400 can begin in step 405, when a customer initiates a service request. The service request can be a request for a service agent to establish and/or configure an audio processing system that is capable of combining content from two or more audio files or audio streams. The service request can also be a request to establish recording environments, which play standardized loudness-level-reference audio segments so that recordings from the environments can be combined at a normalized audio level. The service request can further be a request to troubleshoot an audio system, to train personnel to use an audio system, and the like. In step 410, a human agent can be selected to respond to the service request. In step 415, the human agent can analyze a customer's current system and information needs and can develop a solution. In step 420, the agent can implement the solution. For example, the human agent can configure the customer's system to utilize loudness-level-reference segments to combine audio at normalized levels. In step 425, the human agent can complete service activities for the service request.

It should be noted that while the human agent may physically travel to a location local to adjust the customer's computer or application server, physical travel may be unnecessary. For example, the human agent can use a remote software agent to remotely manipulate the customer's computer system.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for combining audio comprising:
   detecting audio content contained in two different audio files, wherein each of the audio files include a loudness-level-reference segment, each reference segment being played at an approximately equivalent volumes in an environment in which a recording device records the associated audio file, and wherein for each audio file, audio level input settings for the recording device remain unchanged when the reference segment and the audio content are recorded, wherein the recording audio levels of the two different audio files differ from each other and are each optimized for encoded audio content other than the respective loudness-level-reference segments, wherein the optimized audio levels ensures that encoded audio content other than the respective loudness-level-reference audio segments contained in the two different audio files are of high quality and do not suffer from excessive clipping or have poor signal-to-noise-ratio (SNR) quality;
   adjusting an audio level of at least one of the audio files so that an audio level of the reference segments of the adjusted files are approximately equivalent; and
   combining the adjusted audio files into a combined audio file, whereby the different audio files are mixed together at an approximately matching relative audio level.

2. The method of claim 1, wherein the audio content of one of the two different audio files contains speech, wherein the audio content of another of the two different audio files contains background sounds, and wherein audio content of the combined audio file contains speech and the background sounds.

3. The method of claim 2, further comprising:
   inputting the combined audio file into a speech recognition engine.

4. The method of claim 3, wherein the combined audio file is used for at least one purpose selected from a group of purposes consisting of testing the speech recognition engine and training the speech recognition engine.

5. The method of claim 3, wherein the speech containing audio file is one of a plurality of speech containing audio files able to be selectively combined with the audio file that contains background sounds.

6. The method of claim 3, wherein the background sound containing audio file is one of a plurality of background sound containing audio files able to be selectively combined with the audio file that contains speech.

7. The method of claim 3, wherein the detecting, adjusting, and combining steps are performed by a speech processing software tool, said tool including a data store containing a plurality of speech audio files and a plurality of background sound audio files, which include said speech containing audio file and said background sound containing audio file, and wherein said tool permits a user to selectively combine any of the speech audio files with any of the background sound audio files.

8. The method of claim 1, wherein the reference segments are included in the audio files to ensure that audio content of the audio files is able to be combined at a matching level of relative audio level even when the two different audio files are recorded at different audio levels.

9. The method of claim 1, wherein the steps of claim 1 are performed by at least one of a service agent and a computing device manipulated by the service agent, the steps being performed in response to a service request.

10. A method for recording audio so that the recorded audio is able to be combined with other audio at matching relative audio levels comprising:
    playing a loudness-level-reference audio segment in an audio environment;
    recording the loudness-level-reference audio segment with a recording device;
    recording additional audio content with the recording device without adjusting recording audio level settings from those settings established when the loudness-level-reference audio segment was recorded;
    creating an audio file that includes the loudness-level-reference audio segment and the additional audio content, wherein a sound pressure level of the played loudness-level-reference audio segment is standardized for a plurality of different audio files, wherein the loudness-level-reference is used to ensure different audio files are able to be combined at approximately matching relative audio levels;
    selecting a different audio file that includes a different loudness-level-reference audio segment;
    adjusting an energy level of at least one of the created audio file and the different audio file so that after the adjusting step, a root mean square energy for the loudness-level-reference audio segment of the created audio file is approximately equivalent to a root mean square energy for the different loudness-level-reference audio segment of the different audio file; and
    generating a combined audio file comprising content from the created audio file and the different audio file, as said files exist after said adjusting step is performed against said files, wherein the recording audio levels of the created audio file and the different audio file differ from each other and are each optimized for encoded audio content other than the respective loudness-level-reference audio segments, wherein the optimized audio levels ensures that encoded audio content other than the respective loudness-level-reference audio segments contained in the created audio file and the different audio file are of high quality and do not suffer from excessive clipping or have poor signal-to-noise-ratio (SNR) quality.

11. The method of claim 10, further comprising;
optimizing the recording audio level settings for audio characteristics of the additional audio content.

12. The method of claim 10, further comprising:
after the playing step, using a sound pressure level meter to determine a sound pressure level of the played audio segment measured relative to a location of the recording device; and
before recording the loudness-level-reference audio segment, adjusting a play back volume so that a sound pressure level measured for the loudness-level-reference audio segment is approximately equal to a previously determined standardized sound pressure level for the played loudness-level-reference audio segment.

13. The method of claim 10, wherein the recording audio levels of the created audio file and the different audio file differ from each other.

14. The method of claim 10, wherein said created audio file comprises speech content, and wherein said different audio file comprises background sounds, wherein said combined audio file is input into a speech recognition engine, which is to speech recognize said speech content and to treat said background sounds as ambient noise.

15. The method of claim 10, wherein said steps of claim 10 are steps performed automatically by at least one machine in accordance with at least one computer program having a plurality of code sections that are executable by the at least one machine.

16. The method of claim 10, wherein the steps of claim 10 are performed by at least one of a service agent and a computing device manipulated by the service agent, the steps being performed in response to a service request.

17. A system for combining audio comprising:
a data store comprising a plurality of audio files, each audio file comprising a loudness-level-reference audio segment and additional audio content, each loudness-level-reference audio segment being played in an audio environment at a standardized sound pressure level in relation to a recording device, which recorded audio files, wherein audio levels of each of the plurality of audio files differ from each other and are each optimized for the additional audio content and not for the loudness-level-reference audio segment, wherein the optimized audio levels ensures that additional audio content contained in the plurality of audio files are of high quality and do not suffer from excessive clipping or have poor signal-to-noise-ratio (SNR) quality; and
an audio combiner configured to combine the additional audio content of at least two audio files of the plurality of audio files into a single audio file, wherein the audio combiner ensures that the additional audio content is combined at an approximately matching relative audio level using the loudness-level-reference audio segments.

18. The system of claim 17, further comprising:
a speech processing tool comprising a user interface and at least one speech recognition engine, wherein said user interface is configured to permit users to select said at least two audio files, said at least two audio files including a speech file and a background sound file, wherein the combined audio content is input into the speech recognition engine, and wherein the combined audio file is used for at least one purpose selected from a group of purposes consisting of testing the speech recognition engine and training the speech recognition engine.

19. The system of claim 17, further comprising:
an audio level detector configured to determine a root mean square energy for the loudness-level-reference audio segments for said at least two audio files; and
an audio level adjuster configured to digitally process at least one of said at least two audio files so that after being digitally processed the loudness-level-reference audio segments for said at least two audio files have an approximately equivalent root mean square energy, wherein said audio combiner combines said at least two audio files after said files have been digitally processed by said audio level adjuster.

* * * * *